(12) United States Patent
Pinto et al.

(10) Patent No.: US 8,078,555 B2
(45) Date of Patent: Dec. 13, 2011

(54) DECOUPLING STATIC PROGRAM DATA AND EXECUTION DATA

(75) Inventors: Edmund Samuel Victor Pinto, Duvall, WA (US); Kenneth D. Wolf, Seattle, WA (US); Robert B. Schmidt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1032 days.

(21) Appl. No.: 11/957,174

(22) Filed: Dec. 14, 2007

(65) Prior Publication Data

US 2009/0158283 A1 Jun. 18, 2009

(51) Int. Cl.
*G06F 15/18* (2006.01)
(52) U.S. Cl. ........................................ 706/14
(58) Field of Classification Search ............ 706/14
See application file for complete search history.

(56) References Cited

U.S. PATENT DOCUMENTS

| | | | |
|---|---|---|---|
| 6,704,743 B1 | 3/2004 | Martin | |
| 7,827,127 B2 * | 11/2010 | Wolf et al. ................ | 706/14 |
| 2006/0229924 A1 | 10/2006 | Aron | |
| 2007/0156486 A1 | 7/2007 | Sanabria | |
| 2007/0239505 A1 | 10/2007 | Shukla | |

OTHER PUBLICATIONS

Good continuation of general 2D visual features: dual harmonic models and computational inference, Ben-Shahar, O.; Zucker, S.W.; Computer Vision, 2005. ICCV 2005. Tenth IEEE International Conference on vol. 2 Digital Object Identifier: 10.1109/ICCV.2005.111 Publication Year: 2005 , pp. 1643-1650 vol. 2.*
Application of grey programming in irregular flights scheduling, Xiuli Zhao; Jinfu Zhu; Mei Guo; Industrial Engineering and Engineering Management, 2007 IEEE International Conference on Digital Object Identifier: 10.1109/IEEM.2007.4419172 Publication Year: 2007 , pp. 164-168.*
Programmed grammars—A new device for generating formal languages, Rosenkrantz, Daniel J.; Switching and Automata Theory, 1967. SWAT 1967. IEEE Conference Record of the Eighth Annual Symposium on Digital Object Identifier: 10.1109/FOCS.1967.28 Publication Year: 1967 , pp. 14-20.*
KIP: a keyphrase identification program with learning functions, Wu, Y.B.; Li, Q.; Bot, R.S.; Chen, X.; Information Technology: Coding and Computing, 2004. Proceedings. ITCC 2004. International Conference on vol. 2 Digital Object Identifier: 10.1109/ITCC.2004. 1286694 Publication Year: 2004 , pp. 450-454 vol. 2.*

\* cited by examiner

*Primary Examiner* — Michael B Holmes
(74) *Attorney, Agent, or Firm* — Workman Nydegger

(57) ABSTRACT

Persisting execution state of a continuation based runtime program. The continuation based runtime program includes static program data defining activities executed by the program. One or more of the activities are parent activities including sequences of child activities. The continuation based runtime program is loaded. A child activity to be executed is identified based on scheduling defined in a parent of the child activity in the continuation based runtime program. The child activity is sent to a continuation based runtime separate from one or more other activities in the continuation based runtime program. The child activity is executed at the continuation based runtime, creating an activity instance. Continuation state information is stored separate from the static program data by storing information about the activity instance separate from one or more other activities defined in the continuation based runtime program.

20 Claims, 3 Drawing Sheets

DECOUPLING STATIC PROGRAM DATA AND EXECUTION DATA

BACKGROUND

Background and Relevant Art

Computers and computing systems have affected nearly every aspect of modern living. Computers are generally involved in work, recreation, healthcare, transportation, entertainment, household management, etc.

Some computing systems implement functionality by employing a continuation based runtime, also known as a workflow. A continuation based runtime executes activities. An activity is defined by a unit of executable code including multiple pulses of work. One of the ways an activity can execute multiple pulses of work is through the scheduling of child activities. A composite activity including a number of child activities enables custom control flows that can be implemented by scheduling child activities 0, 1 or n times as determined by the composite activity. Beyond this flexibility to create new control flows, activities have the following characteristics: Activities have no process affinity i.e., they can be paused and resumed in a different process. Activities have no thread affinity, i.e. different pulses of work can be run on different threads. Activities can be persisted and rehydrated, e.g., an activity can be stored to disk in a dormant state and later restored to active runtime.

Prior systems relied on complete knowledge of a program as well as the program's execution state to both drive program execution as well as enable process agility. This model carried with it a significant processing burden when pausing and resuming a program in a different process as well as a significant storage footprint when persisting a program. Further, when changes to a running program were required, modifications to the program had to be made directly on the program instance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method including acts for persisting execution state of a continuation based runtime program. The method may be practiced in a computing environment executing a continuation based runtime program. The continuation based runtime program includes static program data defining activities executed by the program. One or more of the activities are parent activities including sequences of child activities. The method includes loading the continuation based runtime program. A child activity to be executed is identified based on scheduling defined in a parent of the child activity in the continuation based runtime program. The child activity is sent to a continuation based runtime separate from one or more other activities in the continuation based runtime program. The child activity is executed at the continuation based runtime, creating an activity instance. Continuation state information is stored separate from the static program data by storing information about the activity instance separate from one or more other activities defined in the continuation based runtime program.

In another embodiment a method of resuming a continuation based runtime program using persisted execution state is disclosed. The method may be practiced in a computing environment executing a continuation based runtime program. The continuation based runtime program includes static program data defining activities executed by the program. The method includes accessing stored information about an activity instance. The stored information about the activity instance is stored separate from information about one or more activities statically defined in the continuation based runtime program. The method further includes associating the stored information about the activity instance with an activity of the continuation based runtime program. Execution of the continuation based runtime program is resumed from the activity associated with the information about the activity instance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein separate and distinguish between static program data and execution state data, or data required to execute program instances. Separating static program data and execution state data can dramatically reduce the processing time required to pause and resume an instance in a different process as well as the footprint of execution state during persistence.

Some embodiments described herein allow a modified program to be associated with a previously instantiated instance instantiated before the program was modified and resumed using the modified program and the previously instantiated instance of execution state data. Illustratively, some embodiments allow different static program data from the program data used when creating execution state data to be rehydrated with the execution state data. Thus resuming a particular execution state does not require that the execution state be resumed using the exact same static program data existing when an instance is instantiated and persisted.

Figure 1A:
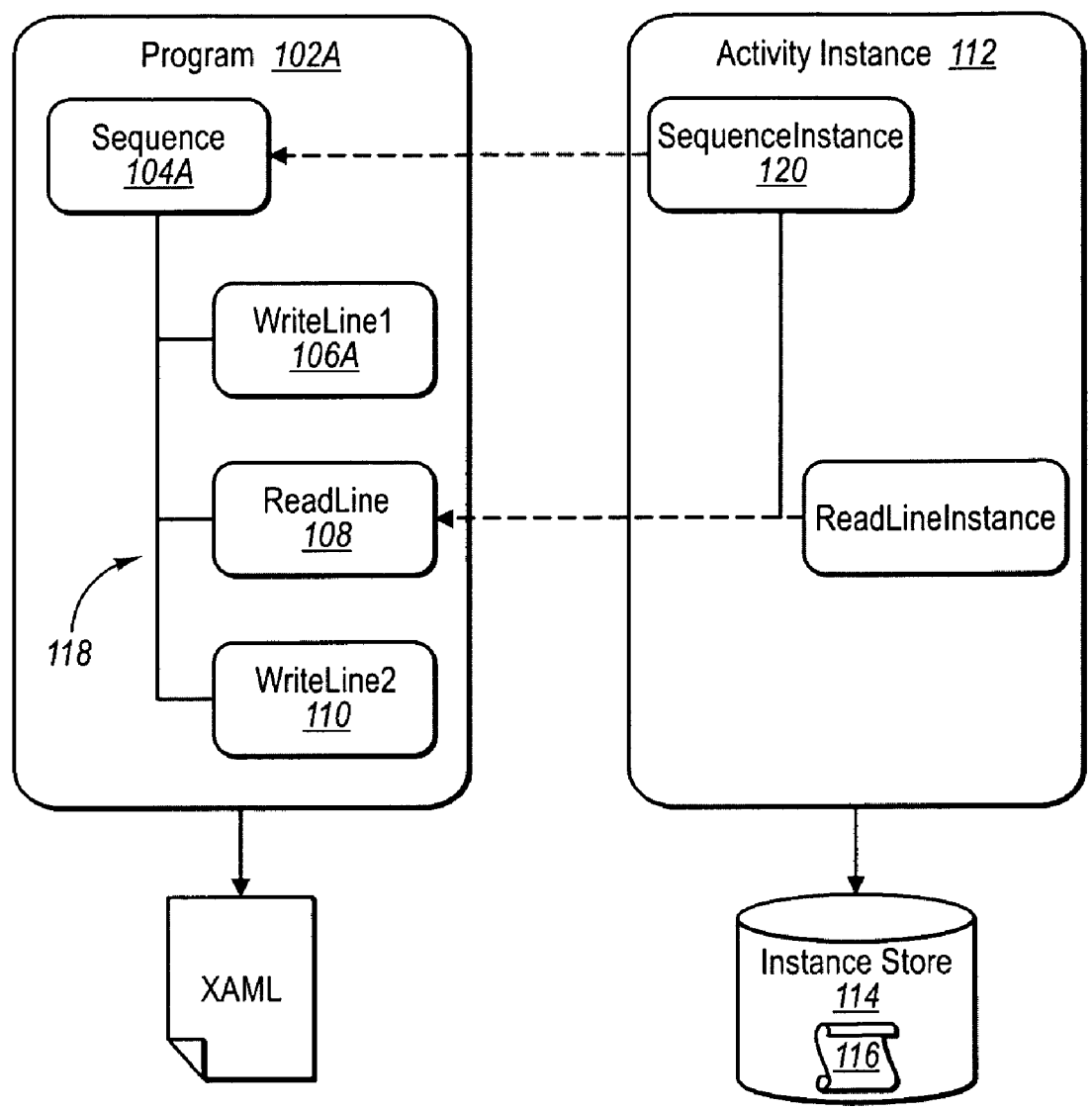
FIG. 1A illustrates an example of a continuation based runtime program and an activity instance of the continuation based runtime program.

Referring now to FIG. 1, an example is illustrated. FIG. 1 illustrates a continuation based runtime program 102. The continuation based runtime program 102 comprises static program data including static activities. The continuation based runtime program includes an activity represented as sequence 104. The sequence activity 104 includes a number of child activities including WriteLine1 activity 106, ReadLine activity 108, and WriteLine2 activity 110. The continuation based runtime program 102 may be stored in one or more of a number of different ways. In the example illustrated here, the continuation based runtime program 102 is stored in an Extensible Application Markup Language (XAML) file. Notably, in other embodiments, the continuation based runtime program may be stored as one or more of in-memory representations, Microsoft Visio diagrams, binary representations, or any other appropriate representation.

Illustrating now an example of how execution data is separated from static program data, a computer system may load the continuation based runtime program 102 from a file. The computer system then begins executing activities in the continuation based runtime program 102. In the example illustrated, the sequence of the child activities 106, 108, and 110 is controlled by the parent activity 104. The execution state is shown as an activity instance 112 and is shown part way through the execution of the sequence activity 104. In this example, the execution of the first child activity 106, WriteLine1, has completed, the second child activity 108, ReadLine, is in an executing state.

Composite activities like sequence 104 schedule child activities 106, 108, and 110 with a continuation based runtime. When the runtime executes an activity, it creates an activity instance 112, which includes execution state, based on the scheduled activity. When an activity completes execution the runtime cleans up the activity instance and signals the parent. Child activities continue to execute as they are scheduled, in the case of the sequence activity 104, this would be the WriteLine2 activity 110. In this manner, in some embodiments, only activities that are currently executing are maintained in memory. As a result, serializing the execution state of a program requires little processor time and execution state has a small footprint. The example illustrated in FIG. 1 illustrates that state information may be persisted as a persisted activity instance 116 in an instance store 114.

In the instance store 114, in some embodiments, activities themselves are not serialized out when referred to by an activity instance. Rather a unique identifier is assigned to that activity and a mapping is serialized out from these unique identifiers to the instances that depend on them. The unique identifier for each activity is determined using a tree walking algorithm that is guaranteed to generate the same identifier for a structurally equivalent program.

The persisted activity instance 116 can later be loaded to continue execution of a suspended continuation based runtime program. The following now illustrates an example of a continuation base runtime program being reconstituted to allow further execution of the continuation based runtime program after it has been persisted or suspended using a persisted activity instance 116.

When a persisted activity instance 116 is loaded from the instance store 114 information is required about the continuation based runtime program 102 to resume execution of the continuation based runtime program 102. The information from the continuation based runtime program 102 was not serialized out as part of the persisted activity instance 116. Therefore, a continuation based runtime program 102 loaded from a program store should be provided and references between persisted activity instances 116 and activities in the continuation based runtime program should be resolved.

As noted previously, in the instance store 114, in some embodiments, activities themselves are not serialized out when referred to by an instance, rather a unique identifier is assigned to that activity and mappings from these unique identifiers to the instances that depend on them are serialized out to the instance store 114. As previously noted, the unique identifier for each activity is determined using a tree walking algorithm that is guaranteed to generate the same identifier for a structurally equivalent program.

As noted, embodiments may be implemented where a persisted activity instance 116 is used to resume a continuation based runtime program that is changed from or different than the continuation based runtime program 102 that was active when the persisted activity instance 116 was created. Given that the tree walking algorithm depends on the structure of the tree, in cases where tree modifications are required because of modifications to the continuation based runtime program 102, a map of previous identifiers to new identifiers may be provided. Notably, the map may be added to static program data so that when a modified program is presented, the runtime has access to the map. In some embodiments, the map may be generated for the program data at the time the change to the program was performed.

Figure 1B:
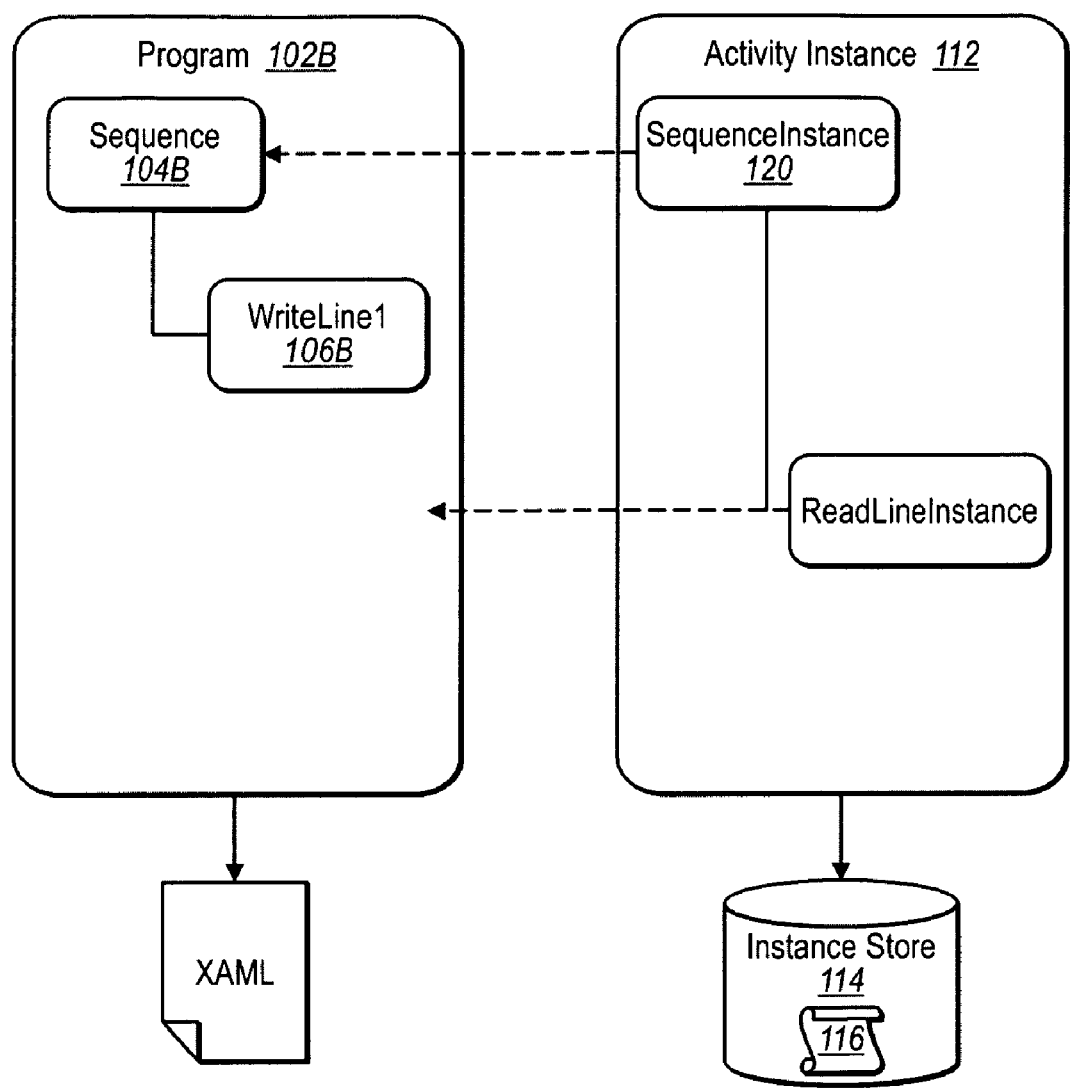
FIG. 1B illustrates an example of validating a continuation based runtime program.

Activity instances may participate in reassociation to validate any modifications to the program. As part of resolving activities to activity instances, each activity instance is given a reference to the activity associated with its serialized identifier. At this point the activity instance has the opportunity to observe modifications made to the activity, as the activity may be different than the original activity that instantiated the particular instance, and reconcile them against its internal state. For example, FIG. 1B illustrates an example of an attempt to re-associate the activity instance 112 with a program 102B. If the program 102B were re-associated with activity instance 112, sequence 104B would observe that the program 102B had been modified from program 102A to have fewer children than were currently executing in the SequenceInstance 120 and the sequence 104B would raise an error.

Figure 2:
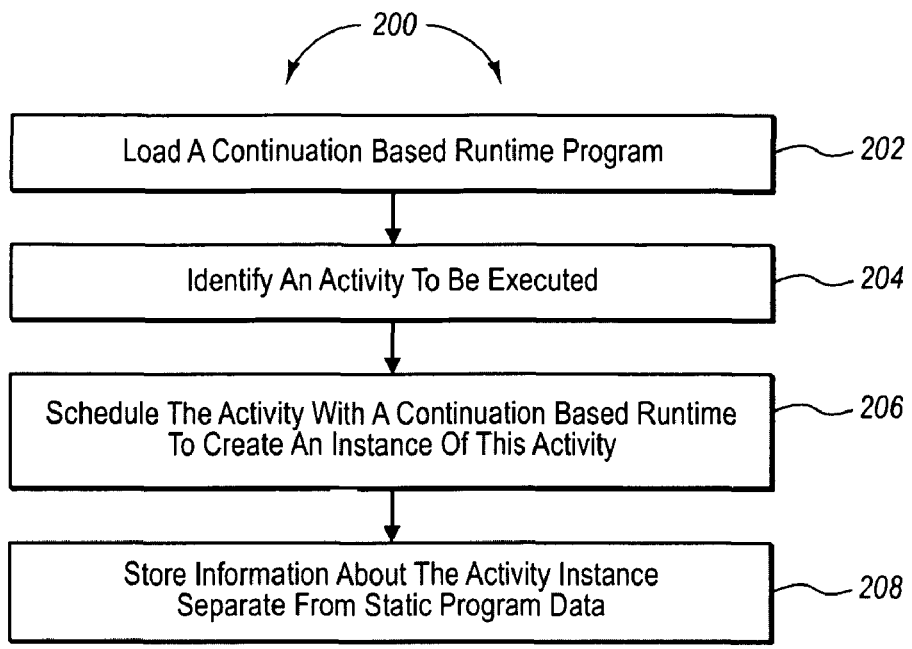
FIG. 2 illustrates a method of persisting continuation based runtime program state information.

Referring now to FIG. 2, an example is illustrated of one method 200 that may be used to persist execution state. The method 200 may be practiced in a computing environment executing a continuation based runtime program. The continuation based runtime program includes static program data defining activities executed by the program. One or more activities are parent activities including sequences of child activities. The method 200 includes loading a continuation based runtime program (act 202). FIG. 1 illustrates an example of a continuation based runtime program 102 which may be loaded.

The method 200 further includes identifying an activity to be executed (act 204). In some embodiments, this may be performed based on execution policy defined in a parent of a child activity in the continuation based runtime program. For example, FIG. 1 illustrates a parent activity 104 with child activities 106, 108, and 110. Selection of one of the child activities to execute may be accomplished based on scheduling defined in the parent activity 104. in the example illustrated, The child activity 108 is selected to be executed as defined by the sequence activity 104.

That method 200 further includes scheduling the activity to a continuation based runtime to create an instance of the activity (206). The activity may be scheduled separate from one or more other activities in the continuation based runtime program. FIG. 1 illustrates an example where an activity instance 112 is created by scheduling the ReadLine activity 108 in a continuation based runtime.

The method 200 further includes the storing continuation state information separate from the static program data (208). This may be accomplished in some embodiments by storing information about the activity instance separate from one or more other activities defined in the continuation based runtime program. As illustrated in FIG. 1, an activity instance 112 may be stored in an instance store 114 as a persisted activity instance 116.

As discussed previously, storing continuation state information (act 208) may include storing a unique identifier associated with the activity instance. The unique identifier may be generated using a tree walking algorithm applied to a tree including activities of the continuation based runtime program. For example, FIG. 1 illustrates a tree 118 which is an illustration of the relationship of different activities in the continuation runtime program 102. An algorithm may be implemented which walks the tree 118 and generates identifiers based on the process of walking the tree 118.

The method 200 may further include mapping the unique identifier to a new unique identifier based on modifications to the tree that differ from the state of the tree when the unique identifier was generated. For example, if the sequence 104 were to change the ordering of the children activities 106 108 110, to add new activities to the sequence activity 104, or to remove activities from the sequence activity 104, the unique identifier for a particular activity would change due to the changes to the tree 118. Thus, some embodiments include the ability to map unique identifiers for activities from one version of a tree to another version of the tree.

Figure 3:
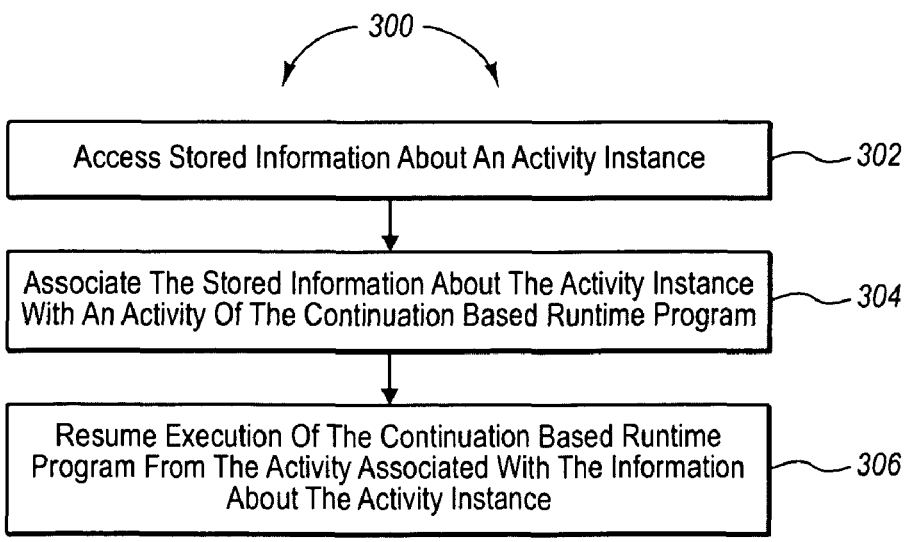
FIG. 3 illustrates a method of resuming a continuation based runtime program using stored state information.

Referring now to FIG. 3, another method 300 is illustrated. The method 300 illustrates acts which may be performed for resuming a continuation based runtime program using persisted execution state. The method 300 may be practiced in a computing environment executing a continuation based runtime program. The continuation based runtime program includes static program data defining activities executed by the program. The method includes accessing stored information about an activity instance (act 302). The stored information about the activity instance is stored separate from information about one or more activities statically defined in the continuation based runtime program. For example, FIG. 1 illustrates a persisted activity instance 116 which is stored as separate from the activities 104, 106, 108, and 110 of the continuation based runtime program 102. Thus in the example illustrated in FIG. 1, a persisted activity instance 116 represents persisted execution state, while the activities 104, 106, 108 and 110 represent static program definition.

The method 300 further includes associating the stored information about the activity instance with an activity of the continuation based runtime program (act 304). In the example illustrated in FIG. 1, the persisted activity instance 116 may be associated with the activity 108 of the continuation based program 102.

The method 300 further includes resuming execution of the continuation based runtime program from the activity associated with the information about the activity instance (act 306). As illustrated in FIG. 1, the continuation based program 102 will continue to execute by sending activities as defined by the sequence activity 104 to a continuation based runtime.

In some embodiments, the information about the activity instance comprises a unique identifier. As noted in other examples, the unique identifier may be generated using a tree walking algorithm applied to a tree including activities of the continuation based runtime program. Further, the method 300 may further include mapping the unique identifier to a new unique identifier based on modifications to the tree, as a result of changes made through the continuation based runtime, that differ from the state of the tree when the unique identifier was generated.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment executing a continuation based runtime program, wherein the continuation based runtime program comprises static program data defining activities executed by the program, wherein one or more of the activities are parent activities comprising a collection of child activities, a method of persisting execution state, the method comprising:
   loading the continuation based runtime program;
   identifying a child activity to be executed based on scheduling defined in a parent of the child activity in the continuation based runtime program;

scheduling the child activity to a continuation based runtime separate from one or more other activities in the continuation based runtime program to create an activity instance; and storing continuation state information separate from the static program data by storing information about the activity instance separate from one or more other activities defined in the continuation based runtime program.

2. The method of claim 1, wherein storing continuation state information comprises storing a unique identifier associated with the activity instance, the unique identifier being generated using a tree walking algorithm applied to a tree comprising activities of the continuation based runtime program.

3. The method of claim 2, further comprising mapping the unique identifier to a new unique identifier based on modifications to the tree that differ from the state of the tree when the unique identifier was generated.

4. The method of claim 1, wherein loading the continuation based runtime program comprises loading at least one of a in-memory structure or stored file.

5. The method of claim 1, wherein scheduling the child activity at the continuation based runtime, to create an activity instance comprises maintaining the child activity in memory while not maintaining other activities of the continuation based runtime program in memory.

6. The method of claim 1, further comprising
cleaning up a prior activity instance; and
notifying the parent of the child activity causing the parent of the child activity to send the child activity to the continuation based runtime.

7. The method of claim 2, wherein the unique identifier is configured to be used in validating a continuation based runtime program when the continuation state information is used to resume execution of a continuation based runtime program.

8. In a computing environment executing a continuation based runtime program, wherein the continuation based runtime program comprises static program data defining activities executed by the program, a method of resuming a continuation based runtime program using persisted execution state, the method comprising:
accessing stored information about an activity instance, the stored information about the activity instance being stored separate from information about one or more activities statically defined in the continuation based runtime program;
associating the stored information about the activity instance with an activity of the continuation based runtime program;
resuming execution of the continuation based runtime program from the activity associated with the information about the activity instance.

9. The method of claim 8, wherein the information about the activity instance comprises a unique identifier, the unique identifier being generated using a tree walking algorithm applied to a tree comprising activities of the continuation based runtime program.

10. The method of claim 9, further comprising mapping the unique identifier to a new unique identifier based on modifications to the tree, as a result of changes performed via the continuation based runtime, that differ from the state of the tree when the unique identifier was generated.

11. The method of claim 9, wherein resuming execution of the continuation based runtime program comprises performing a tree walking algorithm on the tree to generate the unique identifier.

12. The method of claim 8, further comprising validating that the information about the activity instance is valid for the continuation based runtime program prior to resuming execution of the continuation based runtime program.

13. The method of claim 12, wherein validating that the information about the activity instance is valid for the continuation based runtime program comprises determining that a state is possible in the continuation based runtime program that corresponds with the information about the activity instance.

14. The method of claim 8, wherein resuming execution of the continuation based runtime program comprises resuming execution of the continuation based runtime using a first statically defined continuation based runtime program that differs from a second statically defined continuation based runtime program that was used to create the information about an activity instance.

15. In a computing environment executing a continuation based runtime program, wherein the continuation based runtime program comprises static program data defining activities executed by the program, wherein one or more of the activities are parent activities comprising a collection of child activities, a method of persisting execution state, the method comprising:
loading the continuation based runtime program;
identifying a child activity to be executed based on scheduling defined in a parent of the child activity in the continuation based runtime program;
scheduling the child activity to a continuation based runtime separate from one or more other activities in the continuation based runtime program to create an activity instance; and
storing continuation state information separate from the static program data by storing information about the activity instance separate from one or more other activities defined in the continuation based runtime program.

16. The method of claim 15, wherein executing the child activity at the continuation based runtime, creating an activity instance comprises maintaining the child activity in memory while not maintaining other activities of the continuation based runtime program in memory.

17. The method of claim 15, further comprising mapping a unique identifier to the activity instance, the unique identifier being generated using a tree walking algorithm applied to a tree comprising activities of the continuation based runtime program.

18. The method of claim 15, wherein loading the continuation based runtime program comprises loading at least one of a in-memory structure or stored file.

19. The method of claim 15, further comprising
executing the new child activity at the continuation based runtime, creating an new activity instance; and
storing new continuation state information separate from the static program data by storing information about the new activity instance separate from one or more other activities defined in the continuation based runtime program.

20. The method of claim 19, wherein the unique identifier is configured to be used in validating a continuation based runtime program when the new continuation state information is used to resume execution of a continuation based runtime program.

* * * * *